United States Patent
Faust et al.

(10) Patent No.: US 6,196,627 B1
(45) Date of Patent: Mar. 6, 2001

(54) VEHICLE SEAT

(75) Inventors: Eberhard Faust; Karl Pfahler, both of Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/247,603

(22) Filed: Feb. 10, 1999

(30) Foreign Application Priority Data

Feb. 10, 1998 (DE) ............................................. 198 05 173

(51) Int. Cl.⁷ .................................................. A47C 31/00
(52) U.S. Cl. .................................. 297/180.14; 297/180.1
(58) Field of Search ............................. 297/216.1, 180.1, 297/180.13, 180.14, 452.42, 452.55, 452.58; 5/652.1, 652.2

(56) References Cited

U.S. PATENT DOCUMENTS

| | | |
|---|---|---|
| 2,782,834 | * 2/1957 | Vigo . |
| 5,403,065 | * 4/1995 | Callerio . |
| 5,597,200 | * 1/1997 | Gregory et al. . |
| 5,934,748 | * 8/1999 | Faust et al. . |

FOREIGN PATENT DOCUMENTS

| | | | |
|---|---|---|---|
| 3903303 | * 8/1990 | (DE) | ................................. 297/180.14 |
| 196 28 698 | 10/1997 | (DE) . | |
| 0 424 160 | 4/1991 | (EP) . | |
| 89/01306 | * 2/1989 | (WO) | ................................. 297/180.14 |
| WO 96/05475 | 2/1996 | (WO) . | |

* cited by examiner

Primary Examiner—Milton Nelson, Jr.
(74) Attorney, Agent, or Firm—Evenson, McKeown, Edwards & Lenahan, PLLC

(57) ABSTRACT

A vehicle seat has a cushion integrated into a seat part and/or a seat back. The cushion has a ventilation layer through which air can flow and a cushion cover stretched over the cushion surface facing the seated individual. A plurality of electrically driven miniature fans which are located in air channels to blow air into the ventilation layer that terminate at the underside and rear of the cushion facing away from the cushion cover are provided. The air channels extend up to the ventilation layer. To optimize the ventilation efficiency of the seat ventilation, exhaust air channels are provided in the cushion that extend from the ventilation layer up to the underside or rear of the cushion and terminate freely there.

23 Claims, 1 Drawing Sheet

VEHICLE SEAT

This application claims the priority of German Application No. 198 05 173.5, filed Feb. 10, 1998, the disclosure of which is expressly incorporated by reference herein.

BACKGROUND AND SUMMARY OF THE INVENTION

The invention relates to a vehicle seat and, more particularly, to a vehicle seat with a cushion integrated into a seat part and/or a seat back, the cushion consists of a ventilation layer through which air can flow and especially consists of a coarse-mesh spacing kit.

Ventilated vehicle seats of this kind serve to improve seat climate comfort, both when entering a parked vehicle that has been overheated by prolonged exposure to the sun and also during long travel times.

In a vehicle seat of this kind, such as is disclosed in DE 196 28 698 C1, the cushion layer through which air can flow and which consists of a coarse-mesh spacing knit, the so-called ventilation layer, completely covers a cushion cover made of rubberized hair or foam. The cushion layer rests on a cushion support, a spring core for example, and is covered on its top or front facing away from the cushion cover by a pressure distribution layer that is permeable to air and is made of a spacing knit, nonwoven fabric, or open-pored foam. The pressure distribution layer is covered by a cushion cover and a cover filling is inserted between the cushion and the pressure distribution layer. To ventilate the ventilation layer, a plurality of electrically driven miniature fans or miniature blowers is provided. These are placed in the air channels incorporated into the cushion cover. These air channels are distributed over the surface of the cushion. In a limited area above the air channel openings, an intermediate layer that is not permeable to air, a film for example, is located on the top of the ventilation layer that faces away from the air channel opening. This is done so that the air that is blown through the air channel into the ventilation layer does not immediately escape from the pressure distribution layer and the cushion cover, but is deflected and flows through the ventilation layer. The miniature fans draw air from the area of the passenger compartment located below the seat and blow it into the ventilation layer. In the ventilation layer, the air can spread out in all directions and flows through the pressure distribution layer and the cushion cover when the seat is unoccupied, into the air space above the seat surface, thus causing a rapid cooling of the seat surface which may be heated by solar radiation for example. When the seat is occupied, the air flows in the ventilation layer and emerges at the open ends of the ventilation layer. In this way, it creates a temperature and humidity gradient and carries away the air moistened by the seated individual.

The goal of the invention is to optimize the ventilation efficiency of the seat ventilation system in a vehicle seat of the above-mentioned type.

The goal is achieved in a vehicle seat with a cushion integrated into a seat part and/or a seat back. The cushion consists of a ventilation layer through which air can flow and especially consists of a coarse-mesh spacing knit. A ventilation layer, and a cushion cover stretched over the surface of the cushion facing the seated person, along with a plurality of electrically powered miniature fans are also provided. The fans are located in air supply channels that terminate on the cushion side facing away from the cushion cover. The fans blow air into the ventilation layer and extend up to the ventilation layer.

The vehicle seat according to the invention has the advantage of providing exhaust air channels in the cushion such that, when the seat is occupied, the ventilation air can escape from the cushion unimpeded after flowing through the ventilation layer. This thus creates a relatively high humidity and temperature gradient with respect to the micro-climate on the surface of the cushion, so that transpiration moisture is removed efficiently from the cushion surface. At the same time, the resistance to through flow of the ventilation knit layer is reduced, so that the air in the ventilation layer does not press against the surface of the cushion. This thus avoids blowing directly on the seat user. In this way, the seat user does not have the sensation of a draft. As a result of the low through-flow resistance of the ventilation layer, the efficiency of the fans and the ventilation efficiency in general are improved.

Advantageous embodiments of the vehicle seat according to the invention with advantageous improvements and embodiments of the invention are described herein.

According to one preferred embodiment of the invention, the openings of the intake and exhaust air channels on the underside or back of the cushion are located so that the incoming and exhaust air streams are separate from one another. This prevents the exhaust air, in a form of short-circuit flow, from penetrating once again as incoming air into the intake air channels, and as a result increasingly enriching the ventilation air with moisture by passing it several times through the ventilation layer.

If cavities are located in the back part below the cushion in the seat part or behind the cushion in the back part, according to advantageous embodiments of the invention, these cavities are used for drawing in air through the miniature fans located in the intake air channels and are provided for this purpose with an air intake opening through which air can enter from the area below the vehicle seat. The exhaust air channels provided in the cushion extend into air shafts that pass completely through the cavity and terminate outside the cavity.

Other objects, advantages and novel features of the present invention will become apparent from the following detailed description of the invention when considered in conjunction with the accompanying drawings.

DETAILED DESCRIPTION OF THE DRAWINGS

Figure 1A:
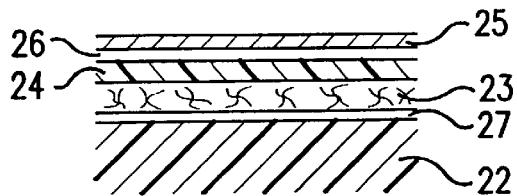
FIGS. 1 and 1A show schematically a cross-section through a vehicle seat according to the invention.
Figure 1:
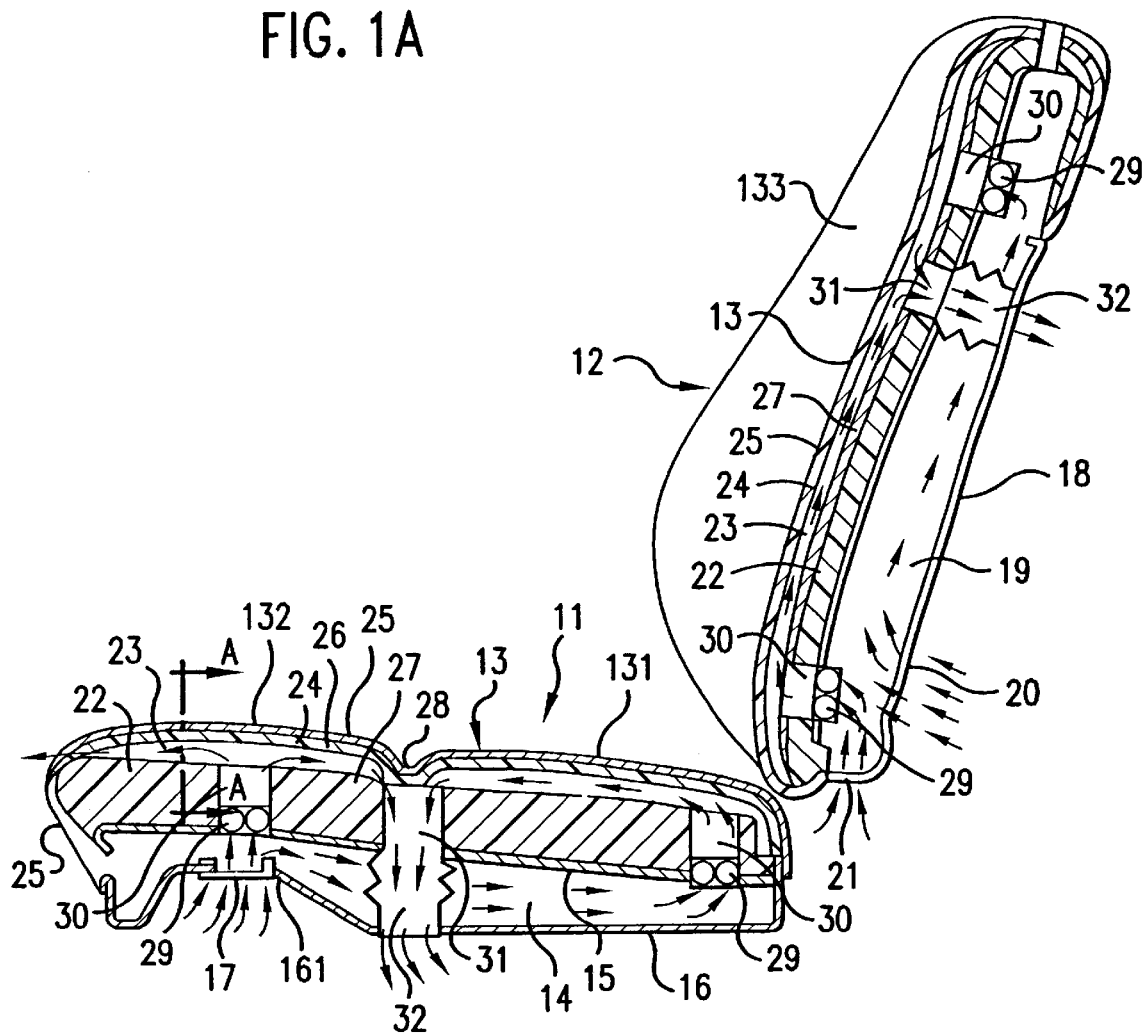

In known fashion as shown in FIG. 1, the vehicle seat has a seat part 11 secured adjustably to the vehicle floor as well as a seat back 12, which is connected with seat part 11 by a pivoting latch (not shown) to adjust the tilt. Seat part 11 and seat back 12 each have a cushion 13 mounted on a cushion support 15. Cushion support 15 in seat part 11 is designed as a spring core made of spring wire, clamped in a seat shell 16. Seat shell 16 seals off a cavity 14 that extends along the underside of cushion 13. In the forward area of seat part 11, a so-called anti-submarining wedge 161 is provided, which serves to support the forward part of cushion support 15 in an extremely powerful brake application or in a head-on collision, thus preventing the seat user from diving under the seat belt. In the vicinity of anti-submarining wedge 161, seat shell 16 has an air intake opening 17 through which air can enter from the underside of seat part 11 into cavity 14.

Cushion 13 in seat back 12 is also supported by a cushion support 15, which likewise can be designed as a spring core which is held in a recliner frame which is not shown here for the sake of clarity. Cushion 13 in seat back 12 is guided around the upper edge of seat back 12 and in the upper area covers the rear of seat back 12. The remainder of the rear of seat back 12 is covered by a rear wall, the so-called recliner trim 18, that is not permeable to air. This leaves a cavity 19 between cushion 13 and recliner frame 18, said cavity extending over the entire surface of cushion 13. Recliner trim 18 has air intake openings 20 and 21 in the lower area of the seat back as well as on the rear of seat back 12 and on the underside of seat back 12, through which openings air can enter cavity 19 from the space below the vehicle seat.

As shown in FIG. 1A, the cushion structure of cushion 13 in seat part 11 and in seat back 12 is largely identical and includes (1) a cushion cover 22 that rests on cushion support 15 and is made of rubberized hair or foam, (2) a ventilation layer 23 made of a coarse-mesh spacing knit that is pulled completely over the entire area of cushion cover 22 and is permeable to air, (3) an air-permeable pressure distribution layer 24 that rests on ventilation layer 23, said layer 24 consisting of a spacing knit, a nonwoven fabric, or an open-pored foam, and (4) an air-permeable cushion covering 25 that is stretched over the surface that faces the seated person. The covering 25 is made of textile, perforated leather, or artificial leather. An air-permeable covering filling 26 is incorporated between cushion cover 25 and pressure distribution layer 24, and an air-permeable thin foam or nonwoven fabric layer 27 is inserted between ventilation layer 23 and cushion cover 22. Covering filling 26 which may include the heat conductors of an electrical seat heater, consists of a layer of open-pored cut foam and/or a wool fleece. There is no covering filling in cushion 13 in seat back 12. Cushion 13 in seat part 11 is divided into a rear cushion zone 131 facing seat back 12 and a front cushion zone 132 facing away from seat back 12 by tacking 28 that runs transversely to the depth of the seat. Two lateral pipings 133 are provided in cushion 13 in seat back 12.

To blow air into air-permeable ventilation layer 23, a plurality of air supply channels 30 is provided in cushion cover 22, said channels completely penetrating cushion cover 22 and air-impermeable thin foam or fleece layer 27 and terminating in the ventilation layer 23 as well as in cavity 14 of seat part 11 or in cavity 19 of seat back 12. In the embodiment, in cushion 13 of seat part 11, at least one air supply channel 30 is located in rear cushion zone 131 near seat back 12 and an air supply channel 30 is located approximately centrally in front cushion zone 132. One air supply channel 30 is provided close to each of the lower and upper ends of seat back 12 in cushion 13 of seat back 12. A plurality of air supply channels 30 spaced transversely from one another side-by-side, and preferably distributed uniformly over the width of the seat, is located in both cushion 13 of seat part 11 and in cushion 13 of seat back 12.

An electrically driven miniature fan or blower 29 that draws air from cavity 14 or 19 and forces it through air supply channels 30 into ventilation layer 23 is provided in each air supply 30. In cushion cover 22, additional air exhaust channels 31 are provided which likewise pass through the foam and/or fleece layer 27 as well as the entire cushion cover 22 from the ventilation layer 23 to the cushion support 15 and each extend in an air shaft 32 that passes completely through cavity 14 or 19 and terminates outside cavity 14 or 19 on the underside of seat part 11 and/or on the back of seat back 12. The air shafts 32 are made elastic in the axial direction and are designed as bellows in this case. In the drawing, in both cushion 13 for seat part 11 and seat back 12, an exhaust air channel 31 with air shaft 32 is shown. Several such exhaust air channels 31 with air shafts 32 are provided however, spaced crosswise from one another and distributed across the width of the seat. The exhaust air channels 31 in cushion 13 of seat part 11, in the vicinity of tacking 28 and the mouths of air shafts 32, are located in a portion of seat shell 16 that is closer to the vehicle floor than the area of anti-submarining wedge 161 with air intake opening 17. The exhaust air ducts 31 in cushion 13 of seat back 12 are located above the middle of the cushion.

When the miniature fans 29 are switched on in seat part 11, air is sucked from the space below seat part 11 or seat back 12 through air intake opening 17 and in seat back 12 through air intake openings 20, 21. The air flows into cavity 14 or 19 and is forced by miniature fans 29 through air supply channels 30 into ventilation layer 23 of cushion 13. When the seat is occupied, the ventilation air flows through the ventilation layer 23 and escapes unimpeded through exhaust air channels 31 and air shafts 32 into the passenger compartment. Since air intake openings 17, 20 and 21 are located at completely different locations in seat shell 16 or in seat back covering 18 than the openings of air shafts 32, this prevents the air escaping through exhaust air channels 31 and air shafts 32 from being sucked back via air intake openings 17, 20, 21 and being supplied once again to ventilation layer 23 in cushion 13. When the seat is unoccupied, the air that is forced through ventilation layer 23 also passes through air-permeable pressure distribution layer 24 and air-permeable cushion cover 25 at the surface of cushion 13 so that the cushion surfaces that have been overheated by prolonged exposure to solar radiation when the vehicle is parked can be ventilated and cooled relatively quickly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat, comprising:
   a cushion integratable into at least one of a seat part and seat back, said cushion including a ventilation layer through which air is flowable, the ventilation layer being a coarse-mesh spacing knit;
   a plurality of air supply channels arranged in the cushion, first sides of which terminate at a side of the cushion opposite a side facing a seating surface and second sides of which extend up to the ventilation layer;
   a plurality of electrically powered miniature fans, one fan being arranged in each air supply channel for blowing air into the ventilation layer;
   exhaust air channels provided in the cushion, said exhaust air channels extending from the ventilation layer and terminating freely at one of lower and rear sides of the cushion.

2. The vehicle according to claim 1, wherein the air supply channels are located in front and rear areas of the cushion of the seat part.

3. The vehicle seat according to claim 1, wherein the air supply channels are located in upper and lower areas of the cushion in the seat back.

4. The vehicle seat according to claim 1, further comprising:
a seat back trim extending along a back of the seat back;
a cavity formed between a back surface of the cushion and the seat back trim, said cavity extending over an entire surface of the cushion;
at least one air intake opening formed in the seat back trim in at least one of a lower back area and an underside of the seat back;
wherein the exhaust air channels each extend in a shaft passing through the cavity and terminate outside the cavity on the back of the seat back trim.

5. The vehicle seat according to claim 4, wherein openings of the air shaft are located in seat back trim above a mid area of the seat back.

6. The vehicle seat according to claim 4, wherein the air shafts are flexible in an axial direction.

7. The vehicle seat according to claim 1, wherein mouths of the air supply and exhaust channels are arranged on at least one of an underside and rear of the cushion such that incoming and outgoing air streams are separated from one another.

8. The vehicle seat according to claim 7, further comprising:
a seat back trim extending along a back of the seat back;
a cavity formed between a back surface of the cushion and the seat back trim, said cavity extending over an entire surface of the cushion;
at least one air intake opening formed in the seat back trim in at least one of a lower back area and an underside of the seat back;
wherein the exhaust air channels each extend in a shaft passing through the cavity and terminate outside the cavity on the back of the seat back trim.

9. The vehicle seat according to claim 7, wherein the exhaust air channels are located approximately centrally in the cushion.

10. The vehicle seat according to claim 9, further comprising:
a seat shell;
a cavity extending over an entire surface of the cushion, said cavity being located between the underside of the cushion and the seat shell;
wherein in an underside of the seat shell, at least one air intake opening is provided; and
further wherein the exhaust air channels include an air shaft passing through the cavity and ending on the underside of the seat shell.

11. The vehicle seat according to claim 10, wherein the seat shell includes an anti-submarining wedge, the air intake opening being located in a vicinity of the wedge; and
further wherein openings of the air shafts are located in the seat shell at a position closer to the vehicle floor than the anti-submarining wedge.

12. The vehicle seat according to claim 1, wherein the exhaust air channels are located approximately centrally in the cushion.

13. The vehicle seat according to claim 12, further comprising:
a seat back trim extending along a back of the seat back;
a cavity formed between a back surface of the cushion and the seat back trim, said cavity extending over an entire surface of the cushion;
at least one air intake opening formed in the seat back trim in at least one of a lower back area and an underside of the seat back;
wherein the exhaust air channels each extend in a shaft passing through the cavity and terminate outside the cavity on the back of the seat back trim.

14. The vehicle seat according to claim 12, wherein the exhaust air channels are located in a vicinity of a cushion tacking.

15. The vehicle seat according to claim 14, further comprising:
a seat shell;
a cavity extending over an entire surface of the cushion, said cavity being located between the underside of the cushion and the seat shell;
wherein in an underside of the seat shell, at least one air intake opening is provided; and
further wherein the exhaust air channels include an air shaft passing through the cavity and ending on the underside of the seat shell.

16. The vehicle seat according to claim 12, further comprising:
a seat shell;
a cavity extending over an entire surface of the cushion, said cavity being located between the underside of the cushion and the seat shell;
wherein in an underside of the seat shell, at least one air intake opening is provided; and
further wherein the exhaust air channels include an air shaft passing through the cavity and ending on the underside of the seat shell.

17. The vehicle seat according to claim 16, wherein the seat shell includes an anti-submarining wedge, the air intake opening being located in a vicinity of the wedge; and
further wherein openings of the air shafts are located in the seat shell at a position closer to the vehicle floor than the anti-submarining wedge.

18. The vehicle seat according to claim 17, further comprising:
a seat back trim extending along a back of the seat back;
a cavity formed between a back surface of the cushion and the seat back trim, said cavity extending over an entire surface of the cushion;
at least one air intake opening formed in the seat back trim in at least one of a lower back area and an underside of the seat back;
wherein the exhaust air channels each extend in a shaft passing through the cavity and terminate outside the cavity on the back of the seat back trim.

19. The vehicle seat according to claim 16, wherein the air shafts are flexible in an axial direction.

20. The vehicle seat according to claim 16, further comprising:
a seat back trim extending along a back of the seat back;
a cavity formed between a back surface of the cushion and the seat back trim, said cavity extending over an entire surface of the cushion;
at least one air intake opening formed in the seat back trim in at least one of a lower back area and an underside of the seat back;
wherein the exhaust air channels each extend in a shaft passing through the cavity and terminate outside the cavity on the back of the seat back trim.

21. The vehicle seat according to claim 20, wherein openings of the air shaft are located in seat back trim above a mid area of the seat back.

22. The vehicle seat according to claim 20, wherein the air shafts are flexible in an axial direction.

23. A vehicle seat, comprising:
- a ventilation layer formed in the vehicle seat;
- air supply channels arranged to supply air to a first side of the ventilation layer which is opposite to a second side facing a seating surface of the vehicle seat;
- at least one exhaust channel receiving air from the first side of the ventilation layer, said exhaust channel having an exhaust end apart from the air supply channels to maintain incoming and outgoing air streams separate from one another, wherein the air supplied to the first side and the air received from the first side flow in substantially different directions.

* * * * *